United States Patent [19]

Rzeszewski

[11] 4,047,227
[45] Sept. 6, 1977

[54] AUXILIARY SIGNAL PROCESSING CIRCUIT

[75] Inventor: Theodore S. Rzeszewski, Lombard, Ill.

[73] Assignee: Matsushita Electric Corporation of America, Franklin Park, Ill.

[21] Appl. No.: 609,307

[22] Filed: Sept. 2, 1975

[51] Int. Cl.² .................................... H04N 5/44
[52] U.S. Cl. .................................... 358/194; 325/466; 340/171 A
[58] Field of Search .......... 178/5.8 R, DIG. 23, 178/DIG. 15; 325/466, 55; 340/171 PF, 171 R, 171 A, 151; 358/194; 179/15 BY

[56] References Cited

U.S. PATENT DOCUMENTS

| | | | |
|---|---|---|---|
| 3,378,817 | 4/1968 | Vitt | 325/55 X |
| 3,452,156 | 6/1969 | Engelbrecht | 325/466 X |
| 3,530,434 | 9/1970 | Stites et al. | 340/171 PF X |
| 3,702,440 | 11/1972 | Moore | 325/466 X |
| 3,758,864 | 9/1973 | Kanamaru | 340/171 PF X |
| 3,812,285 | 5/1974 | Miyata et al. | 178/5.8 R |
| 3,939,465 | 2/1976 | Helton et al. | 340/171 PF X |

*Primary Examiner*—John C. Martin
*Assistant Examiner*—Mitchell Saffian
*Attorney, Agent, or Firm*—Drummond, Nelson & Ptak

[57] ABSTRACT

A television receiver includes a provision for processing auxiliary signals in addition to the conventional information signals. The auxiliary signals comprise various combinations of N signals out of a total of M possible signals, where N and M are positive integers greater than 1, and N is less than M. The auxiliary signals preferably are audio signals outside the normal audible range, and the decoding of unique combinations of these signals at a receiver is used to provide channel number identification when the signals are transmitted from transmitting stations. In addition, the auxiliary signals transmitted from a transmitting station are used to control signal-seek tuning, direct channel access, or channel display. Also, unique combinations of N out of M possible signals are used in a remote control system to provide output signals indicative of different functions to be performed by the television receiver.

16 Claims, 5 Drawing Figures

Fig. 1

FROM THE 9 THRESHOLD COMPARATORS OF FIGURE 2

AUXILIARY SIGNAL PROCESSING CIRCUIT

BACKGROUND OF THE INVENTION

In television transmission systems, either black and white or color, the video and audio information, along with synchronizing signal components, are transmitted as part of a composite signal. It is desirable to include additional information beyond the picture and sound information presently transmitted for the purpose of channel identification and the like. A number of proposals have been made for adding auxiliary signals to the present composite television signals to convey such additional information.

In order to conserve the limited frequency spectrum space which is available for the transmission of signals in the portion of the spectrum allotted to television transmission, it is desirable to transmit such auxiliary information within the same frequency band already occupied by the present composite television signal alone. Auxiliary signal systems have been devised for permitting the transmission of information in addition to the conventional video and sound signals. Most of these prior art systems, however, result in noticeable degradation of the video information carried by the television signal, do not operate at a sufficiently high data rate to be very useful in conveying the additional information, or are unreliable.

Some prior art systems use an approach in which entire frames or fields of the television signal are replaced with frames or fields of an auxiliary image representative signal which may be detected and displayed in a separate receiver. Such systems, however, are subject to substantial data rate limitations. In addition, they cause serious degradation of the normal television signal, because the removal of the normal signal and its replacement with the auxiliary signal, interferes with the reproduction of the normal signals on the cathode ray tube of the receiver.

Another problem which exists in systems which add auxiliary signals to the standard television signals is that such systems often are subject to the production of false indicia in response to white noise or impulse noise interference in the transmission path between the transmitting station and the receiver.

Accordingly, it is desirable to provide a television receiver which responds to auxiliary signals transmitted from a transmitting station or locally from a remote control unit in the room in which the receiver is to be used, which signals can be employed to control various functions in the receiver, such as channel number display and the like. It also is desirable to provide an auxiliary signal system for use in conjunction with television receivers which aids in direct channel access and which also may be utilized as an aid to signal-seek tuning.

SUMMARY OF THE INVENTION

Accordingly, it is an object of this invention to provide an improved auxiliary signal processing circuit for wave signal receivers.

It is an additional object of this invention to provide an auxiliary signal system for television receivers which may be employed as part of the composite signal from a transmitting station or may be utilized as a remote control signal at a local receiver.

It is still another object of this invention to provide an improved signal-seek tuning system for a television receiver.

It is yet another object of this invention to provide an auxiliary signal system for use with television receivers to effect channel number display uniquely corresponding to the transmitting station being received by the receiver.

In accordance with a preferred embodiment of this invention, a television receiver includes provisions for receiving and processing conventional information signals and auxiliary signals. The auxiliary signals comprise various combinations of N signals out of a total of M possible signals, where N and M are positive integers greater than 1 and N is less than M. The auxiliary signals preferably comprise auxiliary audio tones in the baseband of the television sound channel, and filter circuits in the receiver uniquely identify each of the M different auxiliary signal tones. The outputs of the filter circuits are coupled to utilization circuits which respond thereto to attain output conditions in response to the output signals from the filter circuits. These output conditions include channel number display, control of signal-seek tuning, or the like.

In another embodiment of the invention, remote control signals are supplied to a television receiver in the form of various combinations of N signals out of a total of M possible signals where N is less than M. The different combinations of N signals are decoded at the receiver to produce outputs corresponding to the different remote control functions which are selected by the remote control transmitter. Typically, the M control signals are M different audio frequency signals.

DETAILED DESCRIPTION

Referring now to the drawings, like or similar components in the various figures are given the same reference numbers.

Figure 1:
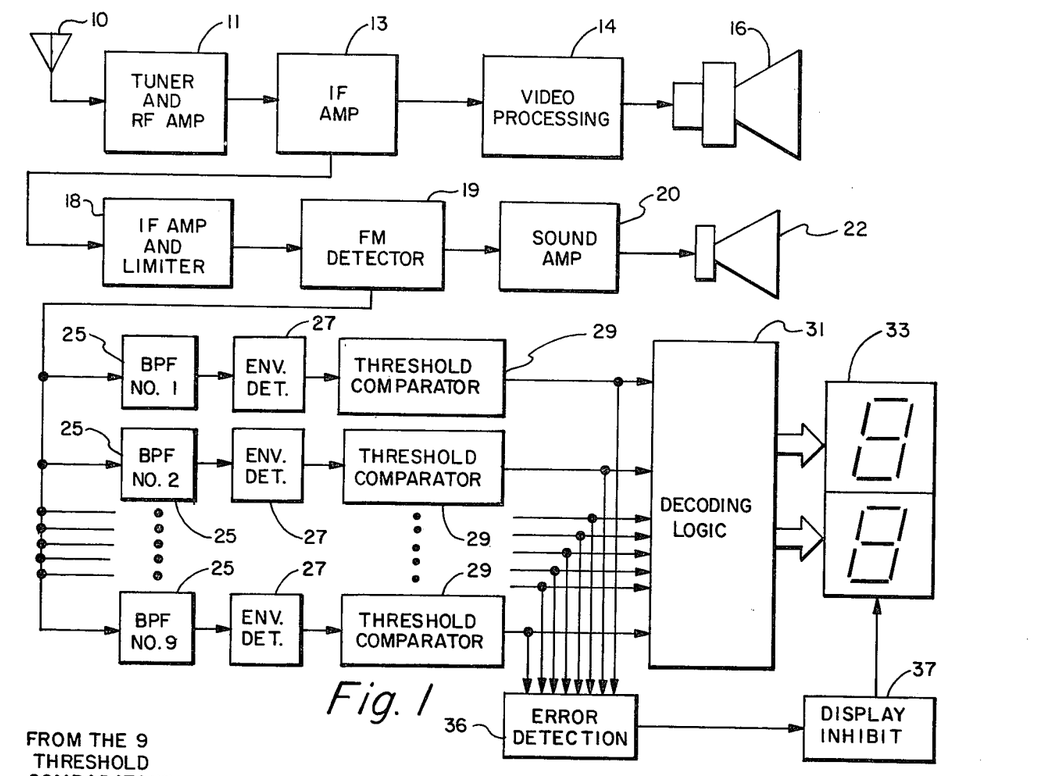
FIG. 1 is a block circuit diagram of a preferred embodiment of the invention.

FIG. 1 is a block diagram of a television receiver for receiving the conventional video and sound signals commonly transmitted by television transmitting stations. In addition, the receiver of FIG. 1 is adapted to receive and process auxiliary pilot tones which are included in the transmitted signal as baseband tones in the TV sound channel. These tones may be continuously transmitted, so that their detection and utilization by the receiver is not subject to any timing or synchronization problems. In addition, the level of the auxiliary tones can be low enough to minimize the deviation away from the conventional audio signals, thereby producing negligible degradation of the sound reproduced by the receiver.

The auxiliary tone signals transmitted from the transmitting station may be used to perform a variety of functions. One of the primary functions for which such auxiliary tones may be utilized is unique channel identification of the station transmitting the tones. This can be accomplished in several different ways. For example, a single tone unique to each transmitting station could be used. The use of a single tone, however, is subject to substantial interference from both white Gaussian noise or impulse noise.

By simultaneously transmitting a fixed number of tones out of a larger number of possible tones from each transmitting station to provide the channel number indication, a significant improvement in inherent interference noise immunity is attained. Thus, if the receiver has a provision for acknowledging that a valid auxiliary signal is comprised of N tones out of M possible tones, and only N tones at all times, where N and M are positive integers greater than 1 and N is less than M, substantial noise interference immunity is obtained. This also permits a reduction in the total number of tones necessary to identify a number of functions by a factor of the number of functions divided by M.

For a system in which a transmitting station for any channel uniquely identifies itself, a combination of three tones out of nine possible tones is sufficient to provide a unique identification for all 82 channels which a receiver is capable of receiving. The number of combinations of M things taken N at a time is given by the formula below:

$$M!/[N!(M-N)!]$$

For nine tones, taken three at a time, this gives:

$$9!/3!6! = 84$$

Therefore, there are 84 different ways that a combination of nine tones taken three at a time can be arranged, and since there are only $83-1=82$ channels, there are two possibilities left over to use in some other way, or which may be discarded.

Since all transmitting stations transmit three tones, all transmitting stations have the same small amount of deviation taken away from the audio. Typically, the tone positions are to space them above the 15 kHz upper frequency of the TV audio, at 1 kHz frequency spacings from 17.5 kHz through 22.5 kHz. The addition of these tones to the conventional video and audio signals at the television transmitter may be accomplished by any conventional means. Typically, the transmitter will use three, fixed-frequency oscillators operating at the three desired frequencies, and these signals then are supplied to the modulator, along with the conventional video and audio signals for transmission from the station.

The composite signal of conventional television video and audio signals, plus the three auxiliary tone signals out of the nine possible tone signals, are received on an antenna 10, which supplies the received signals to a conventional tuner and RF amplifier stage 11 of the receiver. The output of the stage 11 is supplied to the IF amplifier stage 13. This stage, in turn, supplies the video signals to a video processing circuit 14, the output of which controls the video display on a cathode ray tube 16. The output of the IF amplifier 13 also is applied through a second IF amplifier and limiter circuit 18 to an FM detector 19. The detected FM signals of the conventional television signal are applied through a sound amplifier 20 and are reproduced in the loudspeaker 22 of the television receivers.

The additional auxiliary tones in the baseband signal, which are above the audible tones, are also supplied from the FM detector 19 to nine parallel-connected bandpass filters 25 (only three of which are shown in FIG. 1). Each of these filters 25 is a single-tuned filter for passing signals in response to one only of the different auxiliary tone signals which may be present in the composite signal applied to the antenna 10. For example, the bandpass filter No. 1 is tuned to pass signals at 17.5 kHz, bandpass filter No. 2 is tuned to pass signals at 18.5 kHz, and so on, with bandpass filter No. 9 passing signals at 25.5 kHz. Each of the filters 25 rejects all other signals applied to it.

The outputs of the filters 25 are supplied through corresponding envelope detector circuits 27, which also may include limiter circuits, if necessary. The outputs of each of the envelope detector circuits 27 in turn are supplied to corresponding threshold comparator circuits 29. The comparator circuits 29 provide output signals only when the signals applied to the inputs from the envelope detectors 27 exceed a pre-established threshold selected to cause the system to reject low level signals and spurious signals which produce a relatively low level output from the bandpass filters 25.

The outputs of the threshold comparators 29 are applied to a decoding logic circuit 31, which may assume any number of different configurations. Preferably, the circuits 31 comprises coincidence gating circuits for decoding the different unique detected combinations of three simultaneous tones, as indicated by the outputs of the threshold comparators 29, to generate the driving signals for a pair of seven-segment displays 33 for displaying the channel identification number of the channel to which the tuner 11 of the receiver is tuned. The decoding logic in the circuit 31 for accomplishing this purpose is conventional coincidence gating logic of any suitable form.

In the event that noise or some other interference should cause more than three threshold comparators 29 simultaneously to produce an output at any given time, the decoding logic 31 could produce erroneous channel number indications for the seven-segment displays 33. To prevent the display of an erroneous channel number, an error detection circuit 36 is connected to receive inputs fron the outputs of each of the threshold comparator circuits 29. The circuit 36 includes logic gating circuits which produce an error indication whenever more than three threshold comparators 29 provide output signals simultaneously. The output of the error detection circuit 36 is supplied to a display inhibit switching circuit 37 which operates to blank out the seven-segment displays 33 whenever such an error indication is detected. In some applications, it may be desirable to decide on a channel number for display and then continue to display that number until a new channel is requested.

The system of FIG. 1 provides excellent noise immunity using bandpass filters 25 of 100 Hz bandwidth, centered at the nine frequencies from 17.5 kHz to 25.5 kHz mentioned above. In a practical data system, operating with this noise bandwidth and a signal level so low that the television audio is just usuable, it has been computed that the probability of error is less than one in a million. This clearly is acceptable for the system described in conjunction with FIG. 1.

Figure 2:
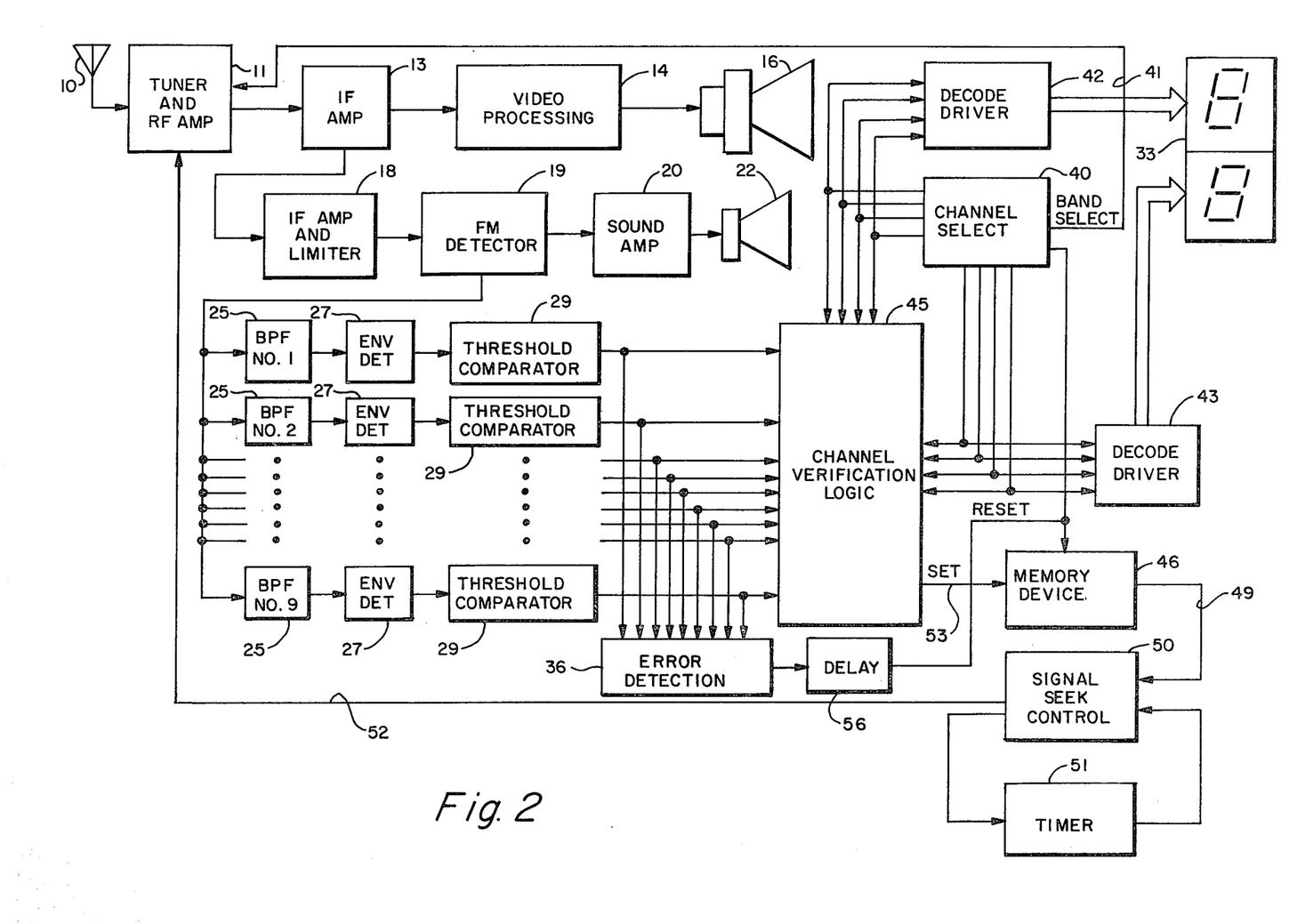
FIG. 2 is a block circuit diagram of another embodiment of the invention.

While the circuit of FIG. 1 accurately detects and displays the channel number of the channel to which the receiver is being tuned, a particular advantage which can be realized when the channel identification tone signal combinations are transmitted by a transmitted station, is to use these signals for the purpose of controlling a signal-seeking system to permit direct channel access at the receiver. The circuit of FIG. 2 shows the modifications which can be made to the circuit of FIG. 1 to effect such direct channel tuning access. The circuit components of the receiver shown in FIG. 2 which operate in the same manner as those shown in FIG. 1 are provided with the same reference numbers and no further descripton of those portions of the circuit is given here.

In the circuit of FIG. 2, the channel number selection for the channel to which the viewer desires to tune the receiver is entered into a channel selection circuit 40. This circuit may be in the form of a keyboard or the like for providing two BCD coded output signals representative of the two digits (the units and tens digits) of the desired channel number. The output signals for the two digits of the channel number are supplied over two sets of four corresponding output leads to a pair of BCD-to-seven-segment decode/driver circuits 42 and 43. The circuits 42 and 43 may be of conventional configuration commonly employed for this purpose. The outputs of the driver circuits 42 and 43 are supplied to a two-digit seven-segment display 33, which then displays the channel number which has been selected by the viewer through the operation of the channel selection circuit 40. At the same time, a signal is applied over a band select lead 41 to the tuner 11 to select the band in which the selected channel is located.

The BCD encoded signals for the two selected digits also are supplied from the channel selection circuit 40 to a channel verification logic circuit 45, which includes coincidence gate circuits unique to each of the different channels to which the receiver can be tuned. The coincidence gate circuits in the channel verification logic circuit 45 also each are connected to a different unique combination of three outputs from the threshold comparator circuits 29 for the purpose of individually comparing the channel indication determined by the outputs of the comparator circuits 29, showing the channel to which the receiver is tuned, with the channel number selected by the channel selection circuit 40.

When the channel selection circuit 40 is first operated, a memory circuit 46, which may be in the form of a bistable flip-flop or the like, is reset to supply an enable output signal over a lead 49 to a signal-seek control ramp generator 50 initiating the generation of a tuning ramp from the circuit 50. The ramp generator 50 also includes a timer 51, preferably in the form of a monostable multivibrator, which prevents initial operation of the signal-seek control circuit 50 from advancing for a time sufficient for the channel verification logic circuit 45 to set the memory flip-flop 46 to its original output state in the event there is initial channel verification between the channel being received by the receiver and the one selected by the channel selection circuit 40.

Once the signal-seek circuit 50 has initiated the generation of a tuning ramp, the voltage ramp supplied over the tuning voltage control lead 52 to the tuner and RF amplifier stage 11 causes the electronic varactor tuning devices in stage 11 to sweep the tuning of the receiver in a conventional manner. A number of different signal-seek control circuits could be used, and the one shown is merely illustrative of one of the approaches which is possible.

Whenever the three tons detected by the bandpass filters 25 causes the appropriate outputs from the threshold comparator circuits 29 to be verified as the channel selected by the channel selection circuit 40 in the verification logic 45, a "set" output is obtained from the channel verification logic on an output lead 53 to set the memory device 46 to its initial state of operation. This removes the signal from the lead 49 and stops the sweep of the signal-seek control circuit 50. The output voltage on the lead 52 then is held at the level which caused the tuner 11 to tune the receiver to the channel which corresponded with the channel selected by the circuit 40. This entire signal-seeking sweep operation is accomplished in a small fraction of a second. Thus, the viewer selecting the channel in the circuit 40 is not even aware that a signal-seek operation is taking place, but, for all outward appearances, direct channel selection appears to be effected.

Figure 4:
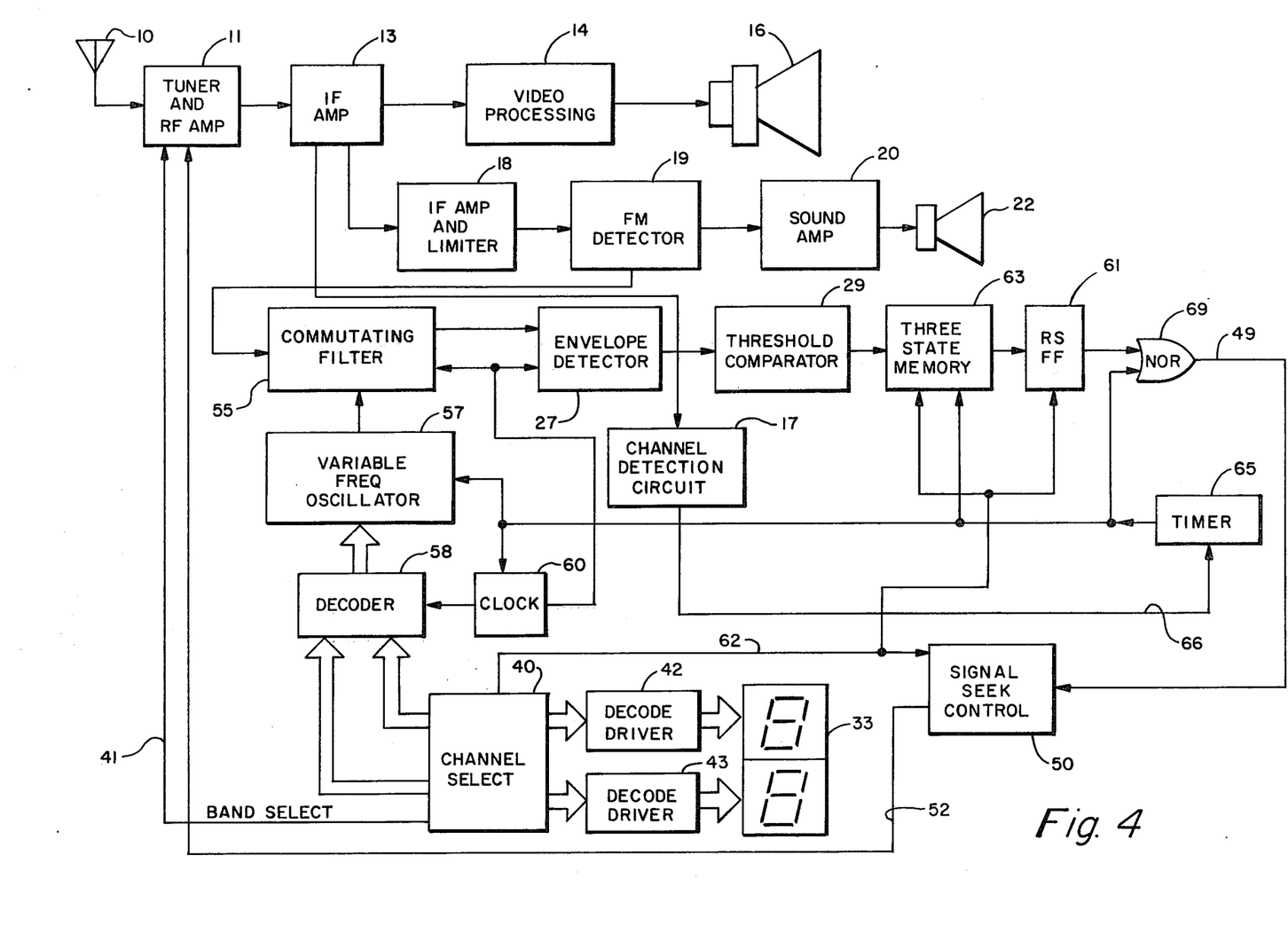
FIG. 4 is a block circuit diagram of another embodiment of the invention.

In some applications, it may be desirable to use a channel detection circuit rather than a simple ramp. This type of an approach is illustrated in FIG. 4 and it should be obvious that it also can be used with the embodiment of FIG. 2.

Figure 3:
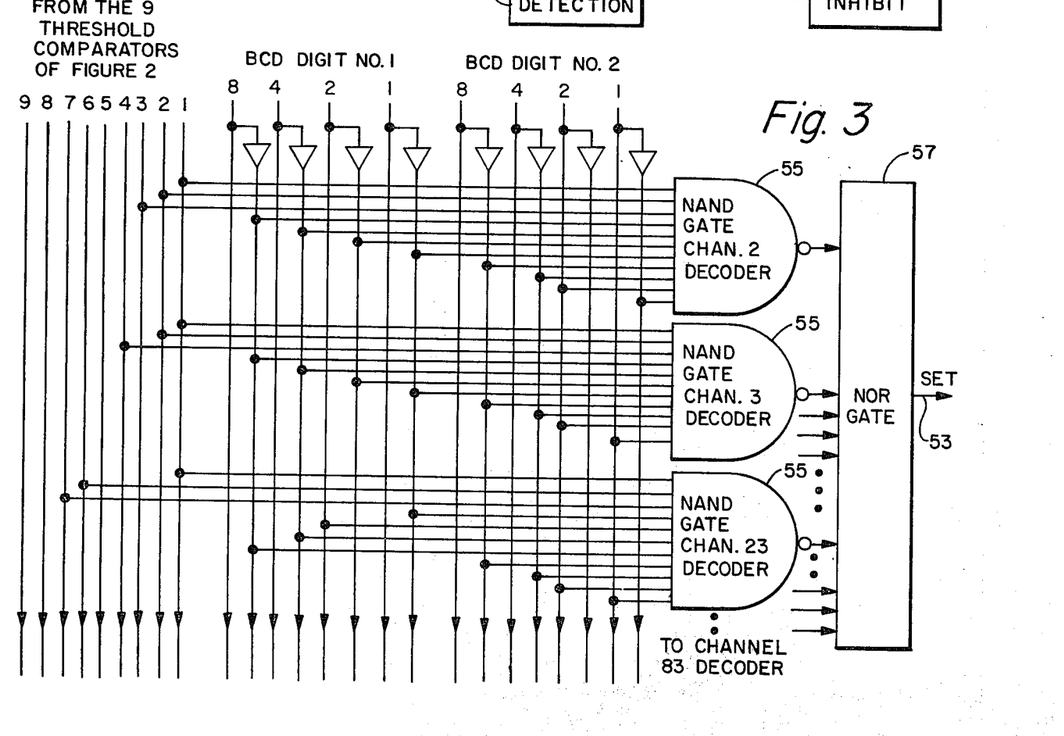
FIG. 3 is a block diagram showing details of a portion of the circuit of FIG. 2.

Reference now should be made to FIG. 3, illustrating a typical gating circuit arrangement which can be used for the channel verification logic circuit 45 of FIG. 2. The output leads from the nine threshold comparators 29 are shown as nine vertical leads at the left of FIG. 3. Each of the different combinations of three outputs from these comparator circuts are applied to different unique NAND gate decoders 55, each associated with a different channel to which the receiver may be tuned. Eight other inputs are applied to each of the NAND gate decoders 55, and these eight inputs are obtained from either the normal or inverted outputs of the two BCD encoded units and tens digits from the channel selection circuit 40. The combinations for decoding channels two, three and twenty-three are specifically shown in FIG. 3. It should be understood that similar decoding combinations for all of the other VHF and UHF channels may be effected in a similar manner.

The outputs from the NAND gates 55 all are supplied to the inputs of a multiple input NOR gate circuit 57, which is illustrated as a simple NOR gate in FIG. 3. Because of the large number of inputs, however, it will be understood that several cascaded NOR gate circuits may be employed, but the logic function is the same as if a single multi-input NOR gate were used. The output of the NOR gate circuit 57 is the "set" output on the lead 53 of FIG. 2. An output is obtained on the lead 53 any time coincidence of all eleven inputs applied to one of the NAND gates 55 occurs. This coincidence means that the two digits of the channel number selected by the channel selection circuit 40 correspond to the same decoded auxiliary tone signals for the received channel number represented by the three corresponding outputs from the threshold comparator circuits 29.

As with the circuit of FIG. 1, an error detection circuit 36 may be used to produce an output any time more than three simultaneous outputs are obtained from the threshold comparator circuits 29. If this did occur, more than one NAND gate 55 would be enabled. The NOR gate 57 would produce only a single output on the "set" output lead 53 and it would be possible to cause the signal-seek control circuit 50 to stop operation with the receiver tuned to a channel different from the one indicated in the display 33 and selected by the channel selection circuit 40. The error detection circuit 36 prevents this from occurring.

Whenever more than three outputs are obtained from the threshold comparator circuits 29, the error detection circuit 36 produces an output which is applied through a delay circuit 56 to reset the memory device 46 in the same manner as it initially is reset by the channel selection circuit 40. This then causes the signal-seek control circuit 50 to continue operation until a proper channel verification is obtained.

Since the unique three-out-of-nine tones are continuously present in the auxiliary signals transmitted by the transmitting station, parallel processing of all nine channels may be employed, as described in conjunction with FIG. 2, to detect the tone combinations for the received channel. Alternatively, single channel processing can be utilized by sequential sampling of the nine different tone possibilities in predetermined combinations of three tones to see if those combinations are present in the received signal. The circuit of FIG. 4 illustrates such a sequential detector. The time required for ascertaining the presence of the desired tone combinations is three times longer than the time required for the parallel processing circut of FIG. 2, but sequential processing may be more economical.

To enable sequential processing or sampling of the received auxiliary tone signals, the auxiliary signals obtained from the output of the FM detector circuit 19 are supplied to a commutating filter 55, or some other similar device like a parallel path filter, the center frequency of which can readily be changed. Commutating filters are known and essentially comprise bandpass filters, the center frequency of which can be changed readily by changing the clock frequency of the filter. The bandwidth of the filter remains the same independently of the center frequency to which the filter is tuned. The fundamental operation of such filters is based on switching between N identical low-pass filter sections at a clock rate N times the desired frequency. The switching then has the effect of reflecting the low pass response about the center frequency, which is the clock rate divided by N, thereby generating the bandpass response. Thus, by varying the clock rate applied to the filter, its resonant frequency can be varied over a relatively wide range, creating a tuneable bandpass filter with constant bandwidth.

Such a commutating filter 55 in FIG. 4 is controlled from a basic clock frequency established by a free running clock oscillator 57. The particular frequency applied to the commutating filter 55 from the variable frequency clock oscillator 57 is controlled by the output of a decoder circuit 58, which operates in response to the channel number selected by the channel selection circuit 40 and a sequence scanning clock 60.

When a new channel number is selected by the channel number selection circuit 40, the channel number is decoded and displayed on the seven-segment display 33 in the same manner described previously in conjunction with FIG. 2. Operation of the channel number selection circuit to a new channel also applies a pulse over a lead 62 to the signal-seek control circuit 50 to initiate operation of that circuit. In addition, the pulse on the lead 62 is applied to a three-bit memory circuit 63 and to a bistable R-S memory 61 to reset the memories to an initial "clear" condition of operation.

The signal pulse of the lead 62 also operates to initiate a ramp generation from the signal-seek control circuit 50. Next, the signal seek acquires the next active channel. This is detected by a channel detection circuit 17. The channel detection circuit 17 may be any suitable "signal-seek" detection circuit which then applies an enabling signal over a lead 66 to a timer circuit 65 (such as a monostable multivibrator) to initiate operation of the sequencing clock, turn on the variable frequency oscillator 57, and temporarily stop the signal seek control 50 from advancing while the decision whether the acquired channel is the correct one is being determined by the circuit.

The sequencing clock 60 causes the decoder 58 to supply an output to the variable frequency oscillator 57 to change the frequency of operation of the oscillator 57 at a rate determined by the operation of the clock circuit 60. The decoder 58 thus causes a repetitive sequence of three different signals to be applied to the variable frequency oscillator 57 to cause its output frequency applied to the filter 55 to scan, on a step-by-step basis, the three different frequencies required to decode the selected channel. Each time one of these frequencies is detected by the commutating filter 55, an output is passed through the envelope detector 27 and a threshold comparator 29 to the threebit memory circuit 63.

The memory circuit 63 operates to sequentially store, on a step-by-step basis, signals representative of the three different signals applied to it. If these signals do not occur within the selected time period determined by the time-out period of the timer 65, no output is obtained from the memory circuit 63 within the time-out period to set memory 61 and a signal is produced by the timer 65 at the end of the time-out period to reset the memory 63. The signal-seek control circuit 50 then continues to generate the tuning ramp voltage on the lead 52 to change the tuning of the tuner and RF amplifier stage 11.

When the signal seek control circuit 50 causes the receiver to acquire a new channel, the circuit 17 applies a new enabling signal on line 66 to the timer 65; and the process continues until the desired channel is reached.

When the three-bit memory 63 provides an output within the time-out period of the timer 65, this is indicative of detection of the three desired frequencies by the commutating filter 55 for the desired channel. This means that the tuner 11 is properly tuned to the selected channel. When this occurs, an output signal indicative of channel acquisition is passed by the three-bit memory through the R-S memory 61 to a NOR gate 69 to the lead 49; and the operation of the signal-seek control circuit 50 is stopped. The timer 65 times out, but the R-S memory 61 now holds the signal-seek control 50 from advancing by applying a signal through the NOR gate 69 and line 49 until it is reset by a new pulse from the channel select circuit 40 on the lead 62.

The descriptions of the circuits shown in FIGS. 1, 2, 3 and 4 all have been directed to the use of combinational codes for channel identification and direct channel access in a signal-seeking system, where combinations of a fixed number of auxiliary tones (described as three tones) out of a greater possible number of auxiliary tones (described as nine tones in the above examples) are transmitted from a transmitting station. A similar technique, however, can be used in a television receiver for implementing remote control functions of the receiver. Such a remote control transmitting and receiving circuit for a television receiver is illustrated in FIG. 5.

Figure 5:
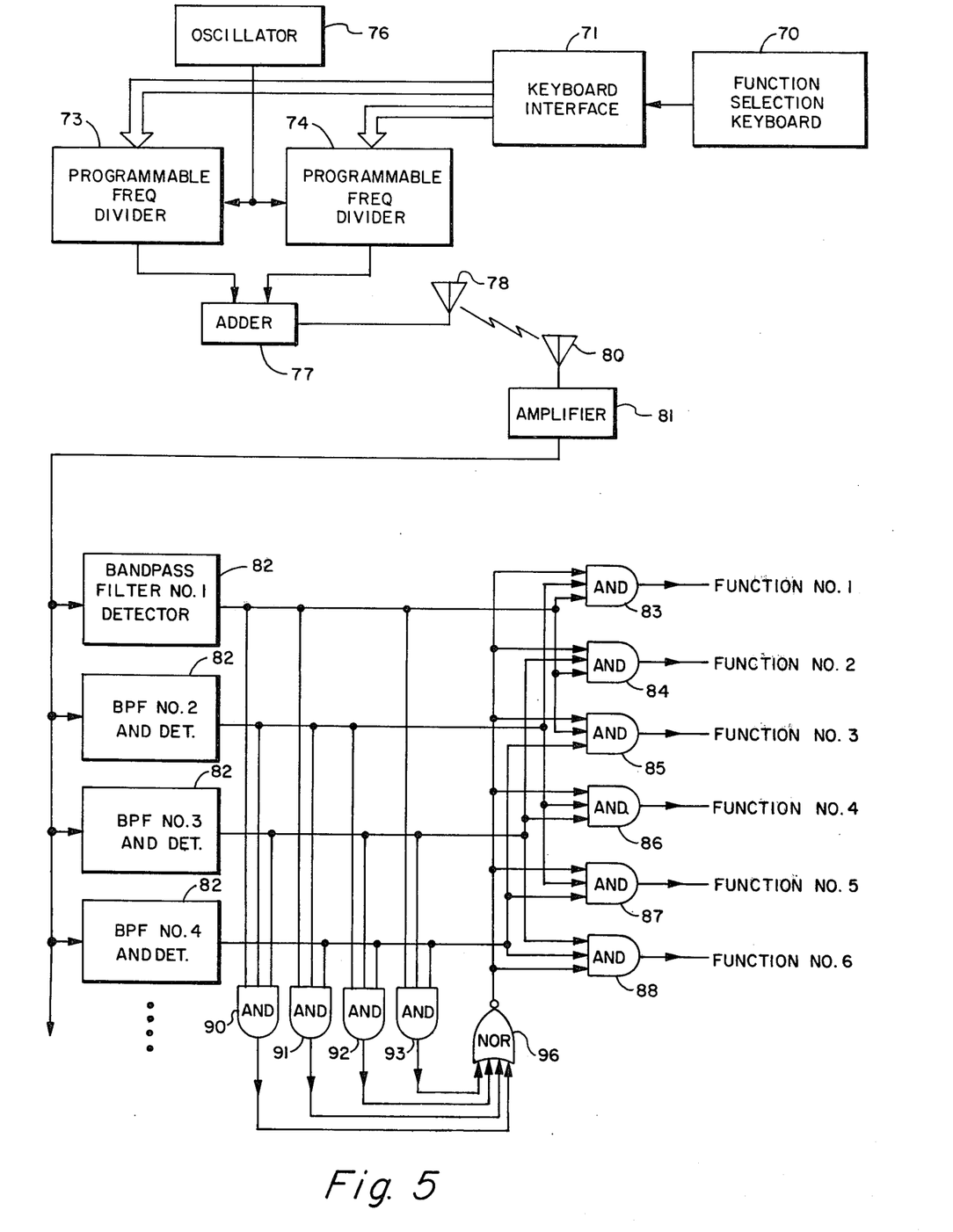
FIG. 5 is a block circuit diagram of yet another embodiment of the invention.

In FIG. 5, a remote control system is shown for performing six different functions. Typical functions are (1) on/off control, (2) volume control, (3) channel scan up, (4) channel scan down, (5) hue control, (6) saturation control, or the like. If direct channel access from a remote control transmitter is desired, a larger number of functions can be employed using the same basic techniques which are employed to generate the above six different functions. For six functions, assume that two tones are transmitted simultaneously out of four possible different tones. This means that six combinations are possible, that is, four tones taken two at a time.

In such a remote control system, a function selection keyboard 70 may use switches for selecting the different functions which are to be remotely controlled. A keyboard interface circuit 71 is employed to supply control signals to two programmable frequency dividers 73 and 74, each of which are supplied with input signals from a free-running master oscillator 76. The programmable frequency dividers 73 and 74 and the interface circuit 71 may be of conventional configuration, and are readily implemented in standard digital logic. The frequencies selected under control of the function selection keyboard 70, operating through the interface 71 and the frequency dividers 73 and 74, are supplied to an adder circuit 77 from which they are transmitted over an antenna 78, or the like, to a receiver antenna 80 in the television receiver. In this example, two frequencies are always simultaneously transmitted to select the desired control function.

At the television receiver, the remote control circuitry, coupled to the remote control receiver antenna 80, includes an amplifier 81 for amplifying the tone signals supplied from the remote control unit. These tone signals are applied in parallel to four bandpass filter and detector circuits 82 which function in a manner similar to the bandpass filters and envelope detectors discussed previously in conjunction with FIGS. 1 and 4. The outputs of the four bandpass filter circuits 82 are supplied, in the six different combinations taken two at a time, to six different AND gates 83 through 88. These gates uniquely decode each of the six different functions which can be selected from the two-out-of-four tone combinations.

To insure that impulse noise or other interference does not cause false triggering, four error detection AND gates 90 to 93, each has three inputs attached to three different outputs of the filters 82. The gates 90 to 93 supply at least one input signal to a NOR gate 96 whenever more than two bandpass/detector circuits 82 simultaneously supply outputs to the AND gates 83 and 88. The output of the NOR gate 96 normally enables all of the AND gates 83 through 88. Whenever one of the AND gates 90 to 93, however, supplies an input signal to the NOR gate 96, all of the AND gates 83 to 88 are disabled. This prevents any functions from being performed by the remote control receiver circuit until such time as only a proper two-and-only-two frequency detection is made by the remote control receiver portion of the circuit shown in FIG. 5.

The conventional television receiver circuitry with which the receiver circuit of FIG. 5 is associated has not been illustrated. The circuit of FIG. 5 is readily added to a conventional television receiver, and the different function control output leads are connected to the corresponding varactor or voltage responsive control circuits commonly employed in electronically controlled remote control television receivers.

The foregoing description has been directed toward auxiliary signals in the audio channel. This same type of code, however, can be used in the vertical interval and provide noise immunity and reliable operation.

The foregoing description also has been directed to the use of the invention in a television receiver. A similar system, however, can be used for signal-seeking, direct station selection, or station frequency display in a broadcast FM receiver. There are approximately 100 FM stations from 88 to 108 MHz, and 10 possible auxiliary tone locations with three tones for each station results in 120 available combinations. These tones can be located in the portion of the baseband FM signal which is used for SCA (storecast), that is, from 53 kHz to 75 kHz. If a 1.5 kHz spacing is employed, the tones then would be located at 55.0 kHz, 56.5 kHz, and so on, up to 68.5 kHz for the 10 different tones. Alternatively, 15 possible auxiliary tone locations, with two tones for identifying each station, could be employed. This results in 105 combinations and extends the tone range up to 76.0 kHz. These tones are still within the SCA frequency region. In all other respects, the decoding of the tones and the manner of controlling the receiver to effect station number display or direct station access is the same as for the system described in conjunction with the television receivers.

In the foregoing description, directed primarily to FIGS. 2, 3 and 4, the signal-seek control circuit 50 for generating the ramp voltage supplied to the tuner 11 increases the tuning voltage from a minimum within the selected band upwardly until the desired channel is detected. If the code for a received channel is the same as the code selected by the channel selection circuit 40, the scanning stops. If the codes are not the same, the scanning continues on to the next active channel, and the comparison is repeated until the desired channel is found, or the entire tuning voltage range is covered for the selected band. If the entire range is covered and the selected band is not present in the received signal, the receiver may further include circuitry for indicating that the desired channel is not on the air in the particular location in which it is being operated. The additional circuitry for detecting this condition then can activate an indicator to convey this condition to the viewer, or the scan may simply be stopped to wait for the operator of the receiver to request a new channel.

If varactor tuners were uniform in their characteristics and a precise level of tuning voltage would tune every tuner to a specific channel, it would not be necessary to use auxiliary signals to aid in channel seeking or channel display. However, the high VHF television band has a tolerance which allows the same voltage to tune in adjacent channels on different tuners of the same design. The tolerance of UHF varactor tuners is even greater. The same voltage applied to different UHF varactor tuners of the same design has been found capable of tuning in channels that are as much as five UHF channels apart.

If the access time for locking onto a desired channel by use of the approach described previously in conjunction with FIGS. 2 and 4 is considered too long, the knowledge of the characteristics of the varactor tuners can be utilized to shorten the access time when the auxiliary signals are used to obtain "direct channel access." This can be accomplished by selecting the band from the channel selection circuit 40 in the manner described previously. At the same time, the channel number selection can be used to place a nominal tuning voltage on the tuner that corresponds to the desired channel number, with utilization of a form of wideband AFT to correct the tuning error which results from the different tolerances of the varactor tuners for the different bands. The nominal voltage then places the tuner within a limited range near the desired channel. The range of voltages then necessary to be supplied by the signal-seek control circuit 50 is much lower and can be scanned much more quickly than if the entire band range must be scanned from end to end. The auxiliary signals still are used to check the code against the channel number selected by the channel selection circuit 40 in the manner described previously.

The nominal or starting tuning voltages for each channel conveniently could be stored in an economical ROM memory. The tuning voltage for each channel stored by the ROM does not need to be precise, so that the number of bits of storage for each word can be relatively small. Such variations of the circuits described previously in detail are within the skill of those familiar with this art, and can be readily implemented into the circuits of FIGS. 2 and 4, if desired.

The various embodiments of the invention which have been described in conjunction with the drawings are considered merely illustrative of the application of the encoding technique which is employed for tuning and/or remotely controlling the operation of a television receiver. Other variations may occur to those skilled in the art which fall within the true scope of the invention as defined in the following claims:

I claim:

1. A wave signal receiver for receiving and processing conventional information signals and auxiliary signals, said auxiliary signals always comprising various combinations of exactly N signals out of a total of M possible signals, where N and M each are positive integers greater than 1 and N is less than M, said receiver including in combination:
    first means for identifying each of said M auxiliary signals and producing output signals in response to such identification;
    second means for simultaneously supplying at least the N signals of an auxiliary signal combination to said first means;
    third means coupled with said first means and responsive to different combinations of N auxiliary signal components identified by said first means for producing a predetermined output signal for at least one predetermined combination of N signals; and
    utilization circuit means coupled with said third means for attaining a predetermined output condition in response to the output signals of said third means.

2. The combination according to claim 1 further including inhibit circuit means coupled with the output of said first means and operative in response to the identification of more than N auxiliary signals at any given time for inhibiting the attainment of said predetermined operating condition by said utilization circuit means.

3. The combination according to claim 1 wherein said third means produces a different unique output signal for each different combination of N auxiliary signal components identified by said first means.

4. The combination according to claim 3 wherein said auxiliary signal components comprise signal components for identifying wave signal transmitting stations and wherein each combination of N signals uniquely identifies a particular transmitting station; and said utilization circuit means comprises means for displaying station identifying indicia and the predetermined output condition thereof includes the display of station indicia uniquely identified by the unique output signal from said third means.

5. The combination according to claim 1 wherein said wave signal receiver comprises circuit means for receiving and detecting audio signals, said auxiliary signal components comprise auxiliary audio components in which each of said M possible signals is an audio signal of a different frequency, and said first means includes filter means having different frequency responses for producing output signals in response to the presence of the one of the M auxiliary signals to which said filter means is tuned.

6. The combination according to claim 5 wherein said auxiliary signal components comprise station identification signal components of the transmitting stations supplying wave signals to said wave signal receiver, each station being uniquely identified by a different combination of exactly N audio signals transmitted as auxiliary signal components from that station, said first means comprises M parallel-connected bandpass filter circuits, each of which is tuned to a different one of said M possible auxiliary signals, and said third means comprises a plurality of gating circuit means, each coupled with a different combination of N first means for producing a unique output signal for each such different combination, when the auxiliary signals for each such combination are simultaneously identified by said N first means.

7. The combination according to claim 5 wherein said wave signal receiver further includes tuner means and further including control means for controlling the tuning of said tuner means in response to control signals applied thereto; said control means being coupled with the output of said third means and with said tuner means for applying control signals thereto to cause the tuning of said tuner means to be swept over a predetermined range of frequencies, said control means responsive to said predetermined output signal from said third means for terminating the sweep of tuning of said tuning means.

8. The combination according to claim 7 further including transmitting station selection means producing a predetermined output indicative of a transmitting station to which said wave signal receiver is to be tuned, and wherein said third means comprises station verification logic means coupled with said first means and with the output of said station selection means for comparing the different combinations of N auxiliary signal components with corresponding signal combinations from said station selection means; said logic means producing said predetermined output signal to said sweep circuit control means to terminate the sweep signal output therefrom in response to a predetermined relationship between the output of said station selection means and the output signals from said first means.

9. A wave signal receiver including means for receiving auxiliary signals always comprising various combinations of exactly N signals out of a total of M possible signals, where N and M each are positive integers greater than one and N is less than M, said receiver including in combination:
    M first means for identifying each of said M auxiliary signals and producing output signals in response to such identification unique to each of said M auxiliary signals;
    second means for simultaneously supplying the N signals of each auxiliary combination to said M first means;
    third means coupled with said M first means and responsive to different combinations of N auxiliary signals identified by said first means for producing a unique output signal for each different combination of N signals.

10. The combination according to claim 9 wherein said auxiliary signals comprise signals of M different frequencies, and said first means includes filter means having M different frequency responses for producing output signals in response to the presence of the one of the M auxiliary signals to which said filter means is tuned.

11. The combination according to claim 10 wherein said first means comprises M parallel-connected band-pass filter circuits, each of which is tuned to a different one of said M possible auxiliary signals, and said third means comprises a plurality of gating circuits means, each coupled with a different combination of N first means for producing a unique output signal for each such different combination when the auxiliary signals for each such combination are simultaneously identified by said N first means.

12. The combination according to claim 10 wherein each of said M possible signals is an audio signal of a different frequency.

13. The combination according to claim 9 further including means coupled with the outputs of said first means for inhibiting the production of said output signal from said third means whenever more than N signals out of said M possible signals are simultaneously identified by said first means.

14. The combination according to claim 13 wherein said inhibiting means includes further coincidence gating means coupled with the outputs of said first means and the inputs of said plurality of gating circuit means for inhibiting the production of said output signal by said third means whenever more than N signals out of the total of M possible signals are simultaneously identified by said first means.

15. A remote control system for a television receiver for identifying and processing remote control signals for performing different functions at the receivers, wherein said remote control signals are supplied to said receiver in the form of auxiliary signals always comprising various combinations of N signals out of exactly a total of M possible signals, where N and M each are positive integers greater than 1 and N is less than M, said system including in combination:
  first means for identifying each of said M auxiliary signals and producing output signals in response to such identification;
  second means for simultaneously supplying said N signals of an auxiliary signal combination to said first means; and
  coincidence gating means coupled with said first means and responsive to different combinations of N auxiliary signal components identified by said first means for producing predetermined output signals for each different predetermined combination of N signals said system is capable of detecting, the outputs of said gating means being adapted for utilization as function control signals for the television receiver.

16. The combination according to claim 15 further including means coupled with the outputs of said first means and with said coincidence gating means for inhibiting the production of output signals from said coincidence gating means whenever more than N out of said M possible signals are simultaneously identified by said first means.

* * * * *

UNITED STATES PATENT AND TRADEMARK OFFICE
CERTIFICATE OF CORRECTION

PATENT NO. : 4,047,227
DATED : September 6, 1977
INVENTOR(S) : Theodore S. Rzeszewski It is certified that error appears in the above-identified patent and that said Letters Patent are hereby corrected as shown below:

Column 13, Claim 15, Line 8:

"of N signals out of exactly a" should be --of exactly N signals out of a--.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*